United States Patent
Ali

(10) Patent No.: US 12,415,527 B2
(45) Date of Patent: Sep. 16, 2025

(54) RANGE SENSOR BASED CALIBRATION OF ROADSIDE CAMERAS IN ADAS APPLICATIONS

(71) Applicant: GM Global Technology Operations LLC, Detroit, MI (US)

(72) Inventor: Kamran Ali, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 290 days.

(21) Appl. No.: 18/352,666

(22) Filed: Jul. 14, 2023

(65) Prior Publication Data

US 2025/0018960 A1 Jan. 16, 2025

(51) Int. Cl.
| | |
|---|---|
| *B60W 50/00* | (2006.01) |
| *B60W 50/04* | (2006.01) |
| *B60W 50/06* | (2006.01) |
| *G06T 7/80* | (2017.01) |

(52) U.S. Cl.
CPC ............ *B60W 50/04* (2013.01); *B60W 50/06* (2013.01); *G06T 7/80* (2017.01); *B60W 2050/0052* (2013.01); *B60W 2050/0088* (2013.01); *G06T 2207/10028* (2013.01)

(58) Field of Classification Search
CPC ................. B60W 50/04; B60W 50/06; B60W 2050/0052; B60W 2050/0088; G06T 7/80; G06T 2207/10028; G08G 1/0116; G08G 1/04; H04N 17/002; G01B 21/02

See application file for complete search history.

(56) References Cited

U.S. PATENT DOCUMENTS

| | | |
|---|---|---|
| 12,137,681 B2 | 11/2024 | Sibley et al. |
| 2017/0075355 A1 | 3/2017 | Micks et al. |
| 2020/0025578 A1 | 1/2020 | Wygant et al. |
| 2020/0365013 A1 | 11/2020 | Simon et al. |
| 2021/0150230 A1 | 5/2021 | Smolyanskiy et al. |
| 2021/0264773 A1 | 8/2021 | Zhang |
| 2021/0366273 A1* | 11/2021 | Pan ................ B60W 60/00184 |

(Continued)

OTHER PUBLICATIONS

Andre Ibisch et al., Towards Autonomous Driving in a Parking Garage: Vehicle Localization and Tracking Using Environment-Embedded LIDAR Sensors, 2013 IEEE Intelligent Vehicles Symposium (IV), Jun. 2013, Gold Coast, Australia.

(Continued)

*Primary Examiner* — Ian Jen
(74) *Attorney, Agent, or Firm* — Vivacqua Crane, PLLC

(57) ABSTRACT

A system for range sensor-based calibration of roadside cameras includes one or more cameras and range sensors with overlapping fields of view of a roadway. Control logic stored within and executed by a controller includes control logic for capturing image and range sensor data, for filtering the data to focus on first and second regions of interest (ROIs); for filtering the data to focus on first and second movements of interest (MOIs); for filtering the data to focus on first and second objects of interest (OOIs); for filtering the data to focus on first and second positions of interest (POIs); and for defining that objects detected by the camera and sensor and that satisfy both the first and second ROI, MOI, OOI, and POI filters are matching objects. The control logic calibrates the camera by applying a correction factor based on the matching objects.

20 Claims, 3 Drawing Sheets

(56) References Cited

U.S. PATENT DOCUMENTS

2022/0266867 A1 8/2022 Ballard et al.
2024/0118104 A1 4/2024 Waschulzik

OTHER PUBLICATIONS

Byung Wook Kim et al., Vehicle Positioning Scheme Using V2V and V21 Visible Light Communications, 2016 IEEE 83rd Vehicular Technology Conference, May 2016.

Jens Einsiedler et al., External Visual Positioning System for Enclosed Carparks, 2014 11th Workshop on Positioning, Navigation and Communication, Mar. 2014.

Jens Einsiedler et al., Indoor Micro Navigation Utilizing Local Infrastructure-based Positioning, 2012 Intelligent Vehicles Symposium, Alcala de Henares, Spain, Jun. 2012.

United States Patent and Trademark Office. U.S. Appl. No. 17/739,417, filed May 9, 2022.

Du, Yuchuan, et al. A novel spatio-temporal synchronization method of roadside asynchronous MMW radar-camera for sensor fusion. IEEE transactions on intelligent transportation systems, 2021, 23. Jg., Nr. 11, S. 22278-22289. DOI: 10.1109/TITS.2021.3119079.

Caselitz, Tim, et al. "Monocular camera localization in 3d lidar maps." 2016 IEEE/RSJ International Conference on Intelligent Robots and Systems (IROS). IEEE, 2016.

Cattaneo, Daniele, et al. "Cmrnet: Camera to lidar-map registration." 2019 IEEE intelligent transportation systems conference (ITSC ). IEEE, 2019.

Guerrero-Ibanez, Juan, Sherali Zeadally, and Juan Contreras-Castillo. "Sensor technologies for intelligent transportation systems." Sensors 18.4 (2018): 1212.

\* cited by examiner

RANGE SENSOR BASED CALIBRATION OF ROADSIDE CAMERAS IN ADAS APPLICATIONS

INTRODUCTION

The present disclosure relates to infrastructure-based roadside cameras and the systems and methods of calibrating such roadside cameras.

Camera-based advanced driver assistance systems (ADAS) applications require calibration between roadside cameras and the real-world to perform position estimation in real-world coordinates. Typical calibration methodologies include manually surveying an area to determine real-world positions detectable by the roadside cameras being calibrated. Such manual survey and calibration procedures are time-consuming, cumbersome, and can be otherwise inefficient and complex.

Accordingly, while current systems and methods for calibrating roadside cameras are effective and achieve their intended purpose, there is a need for new and improved systems and methods for calibrating roadside cameras for use in ADAS applications that improve efficiency, decrease complexity, and reduce the quantities of time needed to perform calibration.

SUMMARY

According to several aspects, of the present disclosure a system for range sensor-based calibration of roadside cameras includes one or more roadside cameras. The roadside cameras are fixedly mounted to infrastructure and have a first field of view of at least a portion of a roadway. The system further includes one or more range sensors. The range sensors are fixedly mounted to infrastructure and have a second field of view of at least a portion of a roadway. The first and second fields of view at least partially overlap. The system further includes one or more controllers. Each of the one or more controllers has a processor, a memory, and one or more input/output (I/O) ports. The I/O ports are in communication with the one or more range sensors and the one or more roadside cameras. The memory stores programmatic control logic. The processor executes the programmatic control logic. The programmatic control logic includes at least a first, a second, a third, a fourth, a fifth, a sixth, a seventh, and an eighth control logic. The first control logic causes each of the one or more roadside cameras to capture image data, and causes each of the range sensors to capture range sensor data. The second control logic filters the image data to focus on a first region of interest (ROI), and filters the range sensor data to focus on a second ROI. The third control logic filters the image data to focus on a first movement of interest (MOI), and filters the range sensor data to focus on a second MOI. The fourth control logic filters the image data to focus on a first object of interest (OOI), and filters the range sensor data to focus on a second OOI. The fifth control logic filters the image data to focus on a first position of interest (POI), and filters the range sensor data to focus on a second POI. The sixth control logic selectively determines that objects detected by the roadside camera and by the range sensor satisfy both the first and second ROI, MOI, OOI, and POI filters and defines the objects that satisfy both the first and second ROI, MOI, OOI, and POI filters as matching objects. The seventh control logic saves the matching objects in the memory for calibration. The eighth control logic calibrates the roadside camera by applying a correction factor based on the matching objects, so that the roadside camera accurately and precisely reports locations and movements of the matching objects for use in ADAS applications.

In another aspect of the present disclosure the second control logic further includes control logic that constrains the image data from the roadside camera to a sub-region or ROI within the first field of view in which the image data captured by the roadside camera is reliably accurate and precise, and control logic that constrains the range sensor data from the range sensor to a sub-region or ROI within the second field of view in which the range sensor data captured by the range sensor is reliably accurate and precise. The ROIs within the first and second fields of view are substantially identical.

In yet another aspect of the present disclosure the third control logic further includes control logic that constrains the image data to focus on the first MOI. The first MOI includes predictable and consistent motions of objects along the roadway. The third control logic further includes control logic that constrains the range sensor data to focus on the second MOI. The second MOI includes predictable and consistent motions of objects along the roadway.

In yet another aspect of the present disclosure the predictable and consistent motions of objects along the roadway further include motions in a predefined set of directions, linear or straight-line motions, and motions at predefined accelerations and velocities.

In yet another aspect of the present disclosure the fourth control logic further includes control logic that constrains the image data to define first OOIs by selecting objects that satisfy the first ROI filter, and the first MOI filter, and that are directly and unobstructedly viewable by the roadside camera. The fourth control logic further includes control logic that constrains the range sensor data to define second OOIs by selecting objects that satisfy the second ROI filter, and the second MOI filter, and that are directly and unobstructedly viewable by the range sensor.

In yet another aspect of the present disclosure the fifth control logic further includes control logic that constrains the image data by selecting only first OOIs that are locations within the first ROI having predefined fixed or mobile positions, and control logic that constrains the range sensor data by selecting only second OOIs that are at locations within the second ROI having predefined fixed or mobile positions. The predefined fixed or mobile positions include: locations of lane lines, positions of roadway signage, trees, traffic signals, telecommunications poles, fire hydrants, and/or curbs, and positions of movable or moving OOIs.

In yet another aspect of the present disclosure the sixth control logic further includes control logic that defines the objects as matching objects by comparing objects that satisfy both the first and second ROI, MOI, OOI, and POI filters and verifying one or more of the objects that satisfy both the first and second ROI, MOI, OOI, and POI filters is an identical object detected by both the roadside camera and the range sensor.

In yet another aspect of the present disclosure the eighth control logic further includes control logic that applies the correction factor to image data captured by the roadside camera. The correction factor is based on known physical and geometrical locations of the roadside camera relative to known physical and geometrical locations of the range sensor, and takes a point location in a real-world coordinate system and translates the point to a camera coordinate system according to a calibration matrix $K[I_3|0_3]$ based on a world-homography matrix "H":

1.
$$H = KR[I_3 \mid -\tilde{C}]$$

where R is a rotation and C takes from the world coordinate system to the center of projection of the camera coordinate system;

2.
$$\begin{bmatrix} u' \\ v' \\ w' \end{bmatrix} = \begin{bmatrix} \alpha_x & s & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix}$$

with $\alpha_x = fk_x$ and $\alpha_y = -fk_y$; and $x_{pix} = u'/w'$ and $y_{pix} = v'/w'$ so that:

3.
$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 \mid 0_3]$$

where $\alpha_x$ and $\alpha_y$ are focal lengths in pixels and $x_0$ and $y_0$ are the coordinates of a center of the image in pixels, "s" is a skew parameter that accounts for roadside camera perspective angle and position, and $K[I_3|0_3]$ is the calibration matrix.

In yet another aspect of the present disclosure the calibration matrix $K[I_3|0_3]$ is further adjusted based on the known relative positions of the roadside camera and the range sensor, and based on a radial range or distance $r_d$ between the roadside camera the object in the world coordinate system such that and a height $h_1$ of the roadside camera above ground at which the roadside camera is fixedly mounted, such that: $r = \sqrt{r_d^2 - h_1^2}$.

In yet another aspect of the present disclosure a method for range sensor-based calibration of roadside cameras includes capturing image data with one or more roadside cameras, where the roadside cameras are fixedly mounted to infrastructure and have a first field of view of at least a portion of a roadway, and capturing range sensor data with one or more range sensors, where the range sensors are fixedly mounted to infrastructure and have a second field of view of at least a portion of a roadway. The first and second fields of view at least partially overlap. The method further includes executing programmatic control logic stored within a memory of one or more controllers in communication with the one or more roadside cameras and the one or more range sensors. Each of the one or more controllers has a processor, the memory, and one or more input/output (I/O) ports. The I/O ports are in communication with the one or more range sensors and the one or more roadside cameras. The processor executes the programmatic control logic, including: filtering the image data to focus on a first region of interest (ROI), and filtering the range sensor data to focus on a second ROI; filtering the image data to focus on a first movement of interest (MOI), and filtering the range sensor data to focus on a second MOI; filtering the image data to focus on a first object of interest (OOI), and filtering the range sensor data to focus on a second OOI; filtering the image data to focus on a first position of interest (POI), and filtering the range sensor data to focus on a second POI. The method further includes executing control logic for selectively determining that objects detected by the roadside camera and by the range sensor satisfy both the first and second ROI, MOI, OOI, and POI filters and defining the objects as matching objects. The method further includes executing control logic for saving the matching objects in the memory for calibration; and calibrating the roadside camera by applying a correction factor based on the matching objects, so that the roadside camera accurately and precisely reports locations and movements of the matching objects for use in ADAS applications.

In yet another aspect of the present disclosure the method includes constraining the image data from the roadside camera to a sub-region or ROI within the first field of view in which the image data captured by the roadside camera is reliably accurate and precise, and constraining the range sensor data from the range sensor to a sub-region or ROI within the second field of view in which the range sensor data captured by the range sensor is reliably accurate and precise. The ROIs within the first and second fields of view are substantially identical.

In yet another aspect of the present disclosure the method includes constraining the image data to focus on the first MOI. The first MOI includes predictable and consistent motions of objects along the roadway. The method further includes constraining the range sensor data to focus on the second MOI. The second MOI includes predictable and consistent motions of objects along the roadway.

In yet another aspect of the present disclosure constraining the image and sensor data further includes selecting predictable and consistent motions of objects along the roadway including motions in a predefined set of directions, linear or straight-line motions, and motions at predefined accelerations and velocities.

In yet another aspect of the present disclosure the method includes constraining the image data to define first OOIs by selecting objects that satisfy the first ROI filter, and the first MOI filter, and that are directly and unobstructedly viewable by the roadside camera; and constraining the range sensor data to define second OOIs by selecting objects that satisfy the second ROI filter, and the second MOI filter, and that are directly and unobstructedly viewable by the range sensor.

In yet another aspect of the present disclosure the method includes constraining the image data by selecting only first OOIs that are locations within the first ROI having predefined fixed or mobile positions, and constraining the range sensor data by selecting only second OOIs that are at locations within the second ROI having predefined fixed or mobile positions. The predefined fixed or mobile positions include: locations of lane lines, positions of roadway signage, trees, traffic signals, telecommunications poles, fire hydrants, and/or curbs, and positions of movable or moving OOIs.

In yet another aspect of the present disclosure the method includes defining the objects as matching objects by comparing objects that satisfy both the first and second ROI, MOI, OOI, and POI filters and verifying one or more of the objects that satisfy both the first and second ROI, MOI, OOI, and POI filters is an identical object detected by both the roadside camera and the range sensor.

In yet another aspect of the present disclosure the method includes applying the correction factor to image data captured by the roadside camera. The correction factor is based on known physical and geometrical locations of the roadside camera relative to known physical and geometrical locations of the range sensor, and takes a point location in a real-world coordinate system and translates the point to a camera coordinate system according to a calibration matrix $K[I_3|0_3]$ based on a world-homography matrix "H":

1.
$$H = KR[I_3 | -\tilde{C}]$$

where R is a rotation and C takes from the world coordinate system to the center of projection of the camera coordinate system;

2.
$$\begin{bmatrix} u' \\ v' \\ w' \end{bmatrix} = \begin{bmatrix} \alpha_x & s & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix}$$

with $\alpha_x = fk_x$ and $\alpha_y = -fk_y$; and $x_{pix} = u'/w'$ and $y_{pix} = v'/w'$ so that:

3.
$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 | 0_3]$$

where $\alpha_x$ and $\alpha_y$ are focal lengths in pixels and $x_0$ and $y_0$ are the coordinates of a center of the image in pixels, "s" is a skew parameter that accounts for roadside camera perspective angle and position, and $K[I_3|0_3]$ is the calibration matrix.

In yet another aspect of the present disclosure the method further includes adjusting the calibration matrix $K[I_3|0_3]$ based on known relative positions of the roadside camera and the range sensor, and based on a radial range or distance $r_d$ between the roadside camera the object in the world coordinate system such that and a height $h_1$ of the roadside camera above ground at which the roadside camera is fixedly mounted, such that: $r = \sqrt{r_d^2 - h_1^2}$.

In yet another aspect of the present disclosure a method for range sensor-based calibration of roadside cameras includes capturing image data with one or more roadside cameras, the roadside cameras fixedly mounted to infrastructure and having a first field of view of at least a portion of a roadway. The method further includes capturing range sensor data with one or more range sensors, the range sensors fixedly mounted to infrastructure and having a second field of view of at least a portion of a roadway. The first and second fields of view at least partially overlap. The method further includes executing programmatic control logic stored within a memory of one or more controllers in communication with the one or more roadside cameras and the one or more range sensors. Each of the one or more controllers has a processor, the memory, and one or more input/output (I/O) ports. The I/O ports are in communication with the one or more range sensors and with the one or more roadside cameras. The processor executes the programmatic control logic including control logic for: constraining the image data from the roadside camera to a sub-region or region of interest (ROI) within the first field of view in which the image data captured by the roadside camera is reliably accurate and precise, and for constraining the range sensor data from the range sensor to a sub-region or ROI within the second field of view in which the range sensor data captured by the range sensor is reliably accurate and precise. The ROIs within the first and second fields of view are substantially identical. The method further includes executing control logic for constraining the image data to focus on a first movement of interest (MOI). The first MOI includes predictable and consistent motions of objects along the roadway. The method further includes executing control logic for constraining the range sensor data to focus on a second MOI. The second MOI includes predictable and consistent motions of objects along the roadway including motions in a predefined set of directions, linear or straight-line motions, and motions at predefined accelerations and velocities. The method further includes executing control logic for constraining the image data to define first objects of interest (OOIs) by selecting objects that satisfy a first ROI filter, and a first MOI filter, and that are directly and unobstructedly viewable by the roadside camera. The method further includes executing control logic for constraining, by a first OOI filter, the image data by selecting only first OOIs that are locations within the first ROI having predefined fixed or mobile positions, and constraining, by a second OOI filter, the range sensor data by selecting only second OOIs that are at locations within the second ROI having predefined fixed or mobile positions and that are directly and unobstructedly viewable by the range sensor. The predefined fixed or mobile positions include: locations of lane lines, positions of roadway signage, trees, traffic signals, telecommunications poles, fire hydrants, and/or curbs, and positions of movable or moving OOIs. The method further includes executing control logic for filtering, by a first position of interest (POI) filter, the image data to focus on a first POI, and filtering, by a second POI filter, the range sensor data to focus on a second POI. The method further includes executing control logic for selectively determining that objects detected by the roadside camera and by the range sensor satisfy both the first and second ROI, MOI, OOI, and POI filters and defining the objects as matching objects by comparing objects that satisfy both the first and second ROI, MOI, OOI, and POI filters and verifying one or more of the objects that satisfy both the first and second ROI, MOI, OOI, and POI filters is an identical object detected by both the roadside camera and the range sensor. The method further includes executing control logic for saving the matching objects in the memory for calibration, and calibrating the roadside camera by applying a correction factor based on the matching objects, so that the roadside camera accurately and precisely reports locations and movements of the matching objects for use in ADAS applications. The correction factor is based on known physical and geometrical locations of the roadside camera relative to known physical and geometrical locations of the range sensor, and takes a point location in a real-world coordinate system and translates the point to a camera coordinate system according to a calibration matrix $K[I_3|0_3]$ based on a world-homography matrix "H":

1.
$$H = KR[I_3 | -\tilde{C}]$$

where R is a rotation and C takes from the world coordinate system to the center of projection of the camera coordinate system;

2.

$$\begin{bmatrix} u' \\ v' \\ w' \end{bmatrix} = \begin{bmatrix} \alpha_x & s & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix}$$

with $\alpha_x = fk_x$ and $\alpha_y = -fk_y$; and $x_{pix} = u'/w'$ and $y_{pix} = v'/w'$ so that:

3.

$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 | 0_3]$$

where $\alpha_x$ and $\alpha_y$ are focal lengths in pixels and $x_0$ and $y_0$ are the coordinates of a center of the image in pixels, "s" is a skew parameter that accounts for roadside camera perspective angle and position, and $K[I_3|0_3]$ is the calibration matrix.

In yet another aspect of the present disclosure the method further includes adjusting the calibration matrix $K[I_3|0_3]$ based on known relative positions of the roadside camera and the range sensor, and based on a radial range or distance $r_d$ between the roadside camera the object in the world coordinate system such that and a height $h_1$ of the roadside camera above ground at which the roadside camera is fixedly mounted, such that: $r=\sqrt{r_d^2-h_1^2}$.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
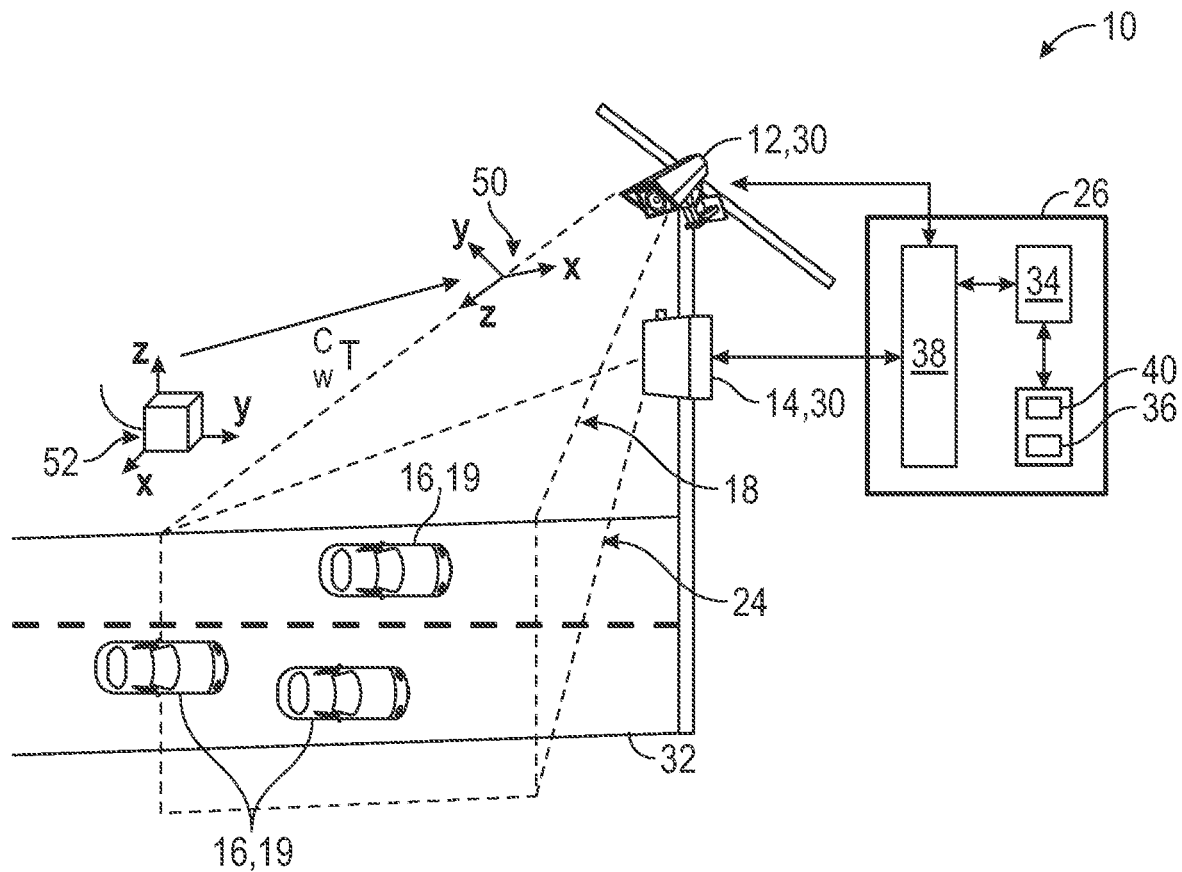
FIG. 1 is a schematic block diagram of a system for calibrating roadside cameras using range sensors for advanced driver assistance system (ADAS) applications according to an exemplary embodiment.

Referring now to FIG. 1 a system 10 for performing automatic calibration of roadside cameras 12 using range sensors 14 is shown schematically. The system 10 calibrates roadside cameras 12 by accurately and precisely ascertaining distances between the camera and data points or objects 16 in the real-world and also within a first field of view 18 of the roadside cameras 12. While the objects 16 may be fixed objects or features such as trees, lamp poles, parking meters, traffic cones, curbs, lane lines, planter boxes, buildings, and the like, it should be appreciated that the objects 16 may be movable or moving objects or features such as humans, animals, vehicles 19, or the like without departing from the scope or intent of the present disclosure. The system 10 further includes one or more range sensors 14, each of the one or more range sensors 14 having a second field of view 24 that substantially overlaps the first field of view 18 of the roadside cameras 12. The roadside cameras 12 and one or more sensors 14 are each in communication with one or more control modules or controllers 26.

In several aspects, the roadside cameras 12 may include any of a variety of different types of cameras without departing from the scope or intent of the present disclosure. For example, the roadside cameras 12 may include cameras capable of capturing optical information in a variety of different wavelengths of light, including but not limited to: infrared, visible, ultraviolet, and the like. The roadside cameras 12 may also be capable of capturing a series of still image data, videographic data or a combination of still and videographic data. In several aspects, the roadside cameras 12 are disposed at one or more locations along a roadway 28, including but not limited to fixed locations 30 proximate an intersection 32. The fixed locations 30 may include infrastructure such as lamp poles, traffic signal supports, crosswalk signal supports, power poles, buildings, or in or on other such fixed locations 30.

In further aspects, the sensors 14 may be any of a variety of different types of range sensor 14 or combinations of range sensors 14 without departing from the scope or intent of the present disclosure. For example, the sensors 14 may be additional cameras, Light Detection and Ranging (LiDAR) sensors, Radio Detection and Ranging (RADAR) sensors, Sound Navigation and Ranging (SONAR) sensors, ultrasonic sensors, or combinations thereof. Further, the range sensors 14 may have the ability to communicate with a Global Positioning System (GPS) in order to more accurately and precisely set a location of the range sensors 14 for use in calibrating the roadside cameras 12 as will be described in further detail herein.

Each of the controllers 26 is a non-generalized electronic control device having a preprogrammed digital computer or processor 34, non-transitory computer readable medium or memory 36 used to store data such as control logic, software applications, instructions, computer code, data, lookup tables, and the like, and one or more input/output (I/O) ports 38. Computer readable medium or memory 36 includes any type of medium capable of being accessed by a computer, such as read-only memory (ROM), random access memory (RAM), a hard disk drive, a compact disc (CD), a digital video disc (DVD), solid-state memory, or any other type of memory. A "non-transitory" computer readable medium or memory 36 excludes wireless, optical, or other communication link that transport electrical or other signals. A non-transitory computer readable medium or memory 36 includes media where data can be permanently stored and media where data can be stored and later overwritten, such as any type of program code, including source code, object code, and executable code. The processor 34 is configured to execute the code or instructions. In some examples, the controller 26 may be a dedicated wireless or Wi-Fi controller. The I/O ports 38 are configured to communicate through wired or wireless means using Wi-Fi protocols under IEEE 802.11x, Bluetooth communications protocols, radio frequency (RF) protocols, or the like.

In several aspects, the controllers 26 include one or more applications 40. An application 40 is a software program configured to perform specific functions or sets of functions. The application 40 may include one or more computer programs, software components, sets of instructions, procedures, functions, objects, classes, instances, related data, or a portion thereof adapted for implementation in a suitable computer readable program code. The applications 40 may be stored within the memory 36 or in an additional or separate memory 36. Examples of the applications 40 include audio or video streaming services, audio or visual processing services, roadside camera 12 calibration application 40, and the like.

Roadside cameras 12, even when disposed on a fixed structure as described herein, are calibrated in order to operate correctly and provide accurate and precise position physical location information of objects 16 to advanced driver assistance systems (ADAS) in communication with the roadside cameras 12. Calibration is particularly important for newly-installed roadside cameras 12, and roadside cameras 12 whose physical position has changed. In some examples, the physical, geometrical position of a roadside camera 12 may change due to weather (high wind speed, snow, hail, or the like); vehicle 19 collisions with infrastructure-mounted roadside cameras 12, construction, roadway 28 modifications, and the like. For roadside cameras 12 whose physical, geometrical position has changed, the positions of objects 16 within the first field of view 18 may be inaccurately reported. Accordingly, to correct for changes in physical positions of roadside cameras 12, especially for roadside cameras 12 in use in ADAS processes, a calibration procedure is carried out by conducting a survey to determine the physical placement of objects 16 relative to the roadside cameras 12 and within the first field of view 18 of the roadside cameras 12.

Figure 2:
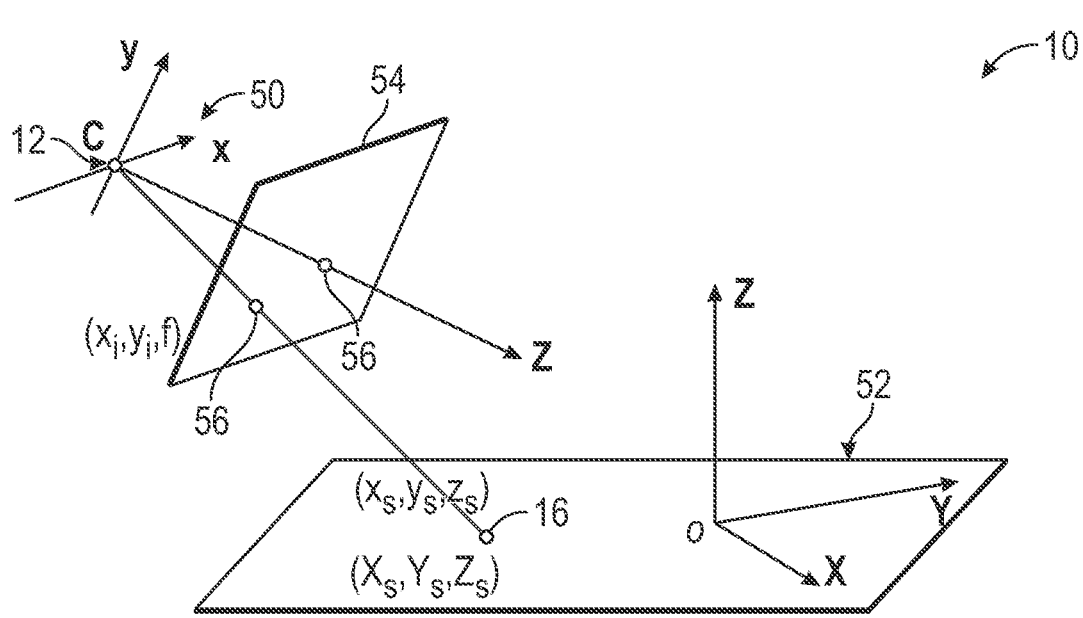
FIG. 2 is a diagram of a camera and a world reference frame for the system for calibrating roadside cameras using range sensors for ADAS applications of FIG. 1 according to an exemplary embodiment.

Turning now to FIG. 2 and with continuing reference to FIG. 1, coordinate systems used to calibrate the roadside cameras 12 using the system 10 of the present disclosure are shown in further detail. Specifically, a camera coordinate system 50 and a world coordinate system 52 are shown in further detail. The camera coordinate system 50 is depicted in an exemplary, but non-limiting pose that corresponds to the physical location and angles of the first field of view 18. The camera coordinate system 50 is applied in an image plane 54 with a plurality of image points 56 determined therein. Each of the plurality of image points 56 is defined by coordinates in the camera coordinate system 50 such that $x_i$ is an X-location, $y_i$ is a Y-location, and f is the focal distance from the roadside camera 12. That is f is, in effect, the Z-location of the image points 56. In several aspects, the image points 56 correspond to the physical locations of objects 16 in the real-world.

The world coordinate system 52 includes the physical locations of the objects 16, where $X_s$ is the X-location, $Y_s$ is the Y-location, and $Z_s$ is the Z-location defining one of the objects 16 in the world coordinate system 52. In several aspects, a transformation is carried out between the camera coordinate system 50 and the world coordinate system 52 to generate a World-Camera Homography Matrix "H" that takes a point location in the real-world coordinate system 52 and translates the point location to the camera coordinate system 50 according to:

1.

$$H = KR[I_3 \mid -\tilde{C}]$$

where R is a rotation and C takes from the world coordinate system 52 to the center of projection of the camera coordinate system 50.

2.

$$\begin{bmatrix} u' \\ v' \\ w' \end{bmatrix} = \begin{bmatrix} \alpha_x & s & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix}$$

with $\alpha_x = fk_x$ and $\alpha_y = fk_y$; and $x_{pix} = u'/w'$ and $y_{pix} = v'/w'$ so that:

3.

$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 \mid 0_3]$$

where $\alpha_x$ and $\alpha_y$ are focal lengths in pixels and $x_0$ and $y_0$ are the coordinates of a center of the image in pixels, "s" is a skew parameter that accounts for roadside camera 12 perspective angle and position, and $K[I_3|0_3]$ is a calibration matrix.

Figure 3:
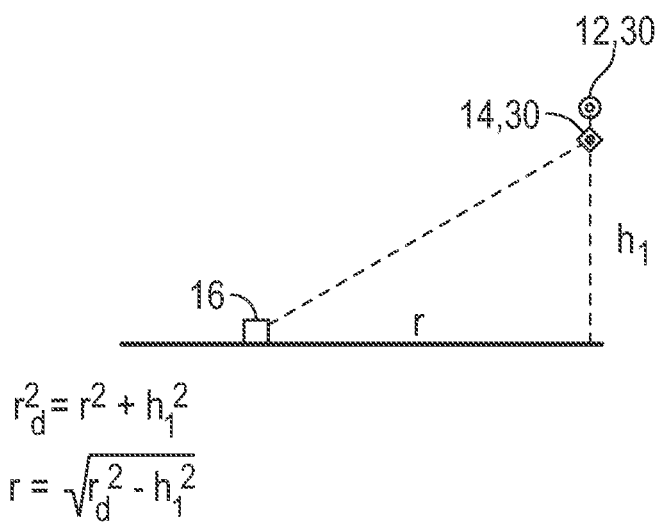
FIG. 3 is a diagram of a coordinate adjustment for the system for calibrating roadside cameras using range sensors for ADAS applications of FIGS. 1 and 2 according to an exemplary embodiment.

Turning now to FIG. 3 and with continuing reference to FIGS. 1 and 2, world coordinates of a range sensor 14 and roadside camera 12 are known and shown schematically as $C_0$ (for the world coordinates of the roadside camera 12) and $R_0$ (for the world coordinates of the range sensor 14). In examples where the roadside camera 12 and range sensor 14 are co-located, it should be appreciated that $C_0=R_0$. The range sensor 14 is used to detect a radial range of objects in the second field of view 24 and compute coordinates in the world coordinate system 52 using a radius r and the world coordinates $R_0$ of the range sensor 14. In several aspects, the radius r is a horizontal or lateral distance from the fixed location of the roadside camera 12 to an object 16 at a known position in the world coordinate system 52.

A vertical height $h_1$ of the roadside camera 12 defines a height above the ground at which the roadside camera 12 is fixedly mounted. Applying the Pythagorean Theorem, $h_1$ defines one adjacent side of a right triangle and r defines the second adjacent side of the right triangle, leaving $r_d$ as the hypotenuse of the right triangle. In several aspects, $r_d$ is a radial range or radial distance between the roadside camera 12 and the object 16 in the world coordinate system 52. Accordingly, it should be appreciated that $r_d^2=r^2+h_1^2$ and therefore, $r=\sqrt{r_d^2-h_1^2}$.

In examples in which the range sensor 14 and roadside camera 12 are co-located, the radius r, the height $h_1$, and the $r_d$ radial range or radial distance is the same for each of the range sensor 14 and roadside camera 12. However, it should be appreciated that the range sensor 14 and roadside camera 12 are not required to be co-located. In several aspects, the range sensor 14 may be located proximate to the roadside camera 12 or may be displaced by a substantial distance from the roadside camera 12 without departing from the scope or intent of the present disclosure. That is, in some examples, the range sensor 14 and roadside camera 12 may be located at the same corner of an intersection 32 and/or fixedly mounted to the same physical infrastructure component and at, or proximate to, the same physical location the physical infrastructure component. In further examples, the range sensor 14 and roadside camera 12 may be located at opposite corners of an intersection 32, at disparate heights, or the like. When the range sensor 14 and road are not co-located, i.e. when the range sensor 14 and roadside camera 12 are displaced by any distance, a mathematical transformation may be used to align the first and second fields of view 18, 24 so that objects 16 detected in each of the first and second fields of view 18, 24 are located in consistently by the range sensor 14 and roadside camera 12 of the system 10.

In order to accurately calibrate the roadside camera 12, the system 10 executes control logic stored in the memory 36 to transform data captured by one or more of the roadside camera 12 and the range sensor 14 via the World-Camera Homography Matrix "H" to find matching objects 16 within the first and second fields of view 18, 24. Representative coordinates of matched objects 16 in the camera coordinate system 50 and corresponding computed coordinates in the world coordinate system 52 are then used to calibrate the system 10.

It will be appreciated that roadside cameras 12 and range sensors 14 such as RADARs and LiDARS utilize different mechanisms to sense or "see" objects 16. Accordingly, the data corresponding to a given object 16 and obtained by each different sensor 14 or roadside camera 12 may not be a direct match to the data obtained by other sensors 14 or roadside cameras 12. However, this limitation is overcome by leveraging contextual information, such as roadway 28 geometry and focusing only on a subset of all possible scenarios to simplify the dataset and increase the probability of finding matched objects 16. Accordingly, the system 10 executes control logic to decrease the quantity of data points or objects 16 detected so that matching procedures are only carried out for a subset of all detected objects 16.

Figure 4:
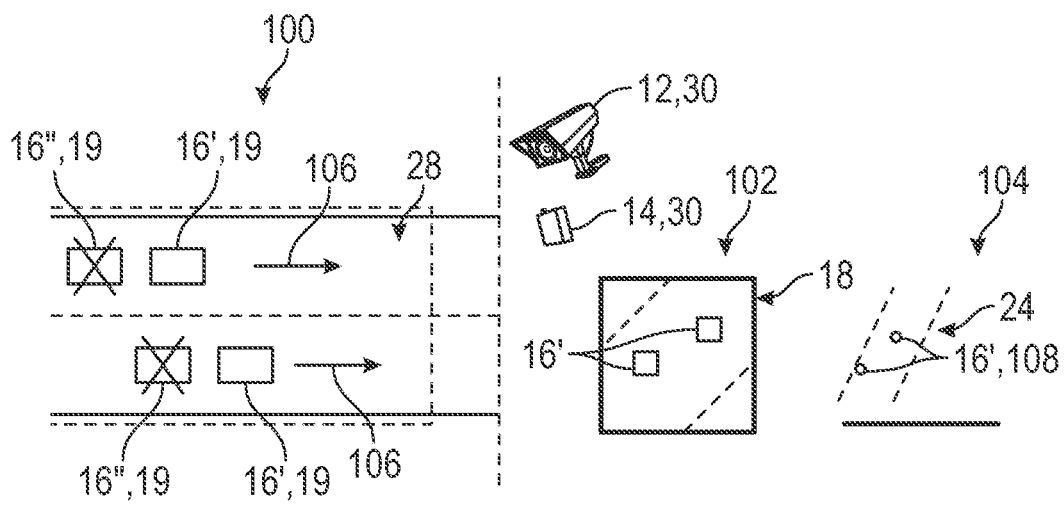
FIG. 4 is a perspective top view of a plurality of vignettes or frames defining aspects of the fields of view of the roadside cameras and range sensors of the system for calibrating roadside cameras using range sensors for ADAS applications of FIG. 1 according to an exemplary embodiment.

Turning now to FIG. 4 and with continuing reference to FIGS. 1-3, several vignettes or frames 100, 102, and 104 are shown. Based on roadway 28 geometry and known allowed vehicle 19 maneuvers, a region of interest (ROI), a motion of interest (MOI), an object of interest (OOI), and a relative position of interest (POI) are specified as constraints in both the first and second fields of view 18, 24 of the roadside camera 12 and range sensor 14, respectively.

The ROI is a predefined subset or sub-region of the first field of view 18 and the second field of view 24 that includes data in which the system 10 has high confidence that objects 16 within the ROI are likely to aid and not hinder the roadside camera 12 calibration process. In several aspects, the ROI includes a region in which the roadside camera 12 and the range sensor 14 have high accuracy and precision, such that objects 16 detected therein are in well-defined positions with well-defined motion characteristics. It will be appreciated that the ROI is a region extending from the roadside camera 12 position and from the range sensor 14 position to a predetermined, high-accuracy, high-precision distance therefrom. Beyond the predetermined, high-accuracy, high-precision distance, objects 16 detected are more likely to be obscured, occluded, or otherwise more inaccurately detected due to optical interference, electromagnetic interference, roadside camera 12 focal length, and other such factors.

Similarly, MOI includes movement of objects 16 within the first and second fields of view 18, 24 that is highly predictable, and consistent, and that are unlikely to adversely effect the roadside camera 12 calibration process. That is, MOI may include, but is not necessarily limited to: objects 16 moving in a straight-line motion, or in a specific predefined direction, or the like. By contrast, vehicles 19 moving erratically, performing multiple lane changes, accelerating or decelerating abruptly, or executing other such actions are unlikely to result in good data for calibration purposes. Accordingly, such erratically-moving vehicles or other such objects 16 do not define MOIs.

OOIs include objects 16 within the first and second fields of view 18, 24 that are easily viewed by the roadside camera 12 and by the range sensor 14 without being obscured, obfuscated, or the like. That is, the OOIs are objects 16 that are not obscured or partially obscured by other objects 16, by infrastructure, by inclement weather conditions, or by other optical, electromagnetic, or audio impairments or conditions. Because objects 16 that are obscured or partially obscured are less "visible" to the roadside camera 12 and/or to the range sensors 14, such obscured or partially obscured objects 16 are less well defined in the data captured by the roadside camera 12 and/or range sensors 14, and accordingly, the data relating to such obscured or partially obscured objects 16 is less reliable than similar data relating to unobscured objects 16 for roadside camera 12 calibration.

POIs include positions of objects 16 that are of particular interest to the roadside camera 12 calibration process. Such POIs may include locations within the ROI such as lane lines, the positions of roadway 28 signage, trees, traffic signals, telecommunications poles, fire hydrants, curbs, or other such objects 16 having well-defined positions, or the like. Such POIs offer well-defined and easily documented and reliable data for comparison between the roadside camera 12 data and the range sensor 14 data for calibration purposes. It should be appreciated, however, that while the POIs have been described hereinabove as generally being immobile positions of infrastructure, other movable positions may equally be POIs without departing from the scope or intent of the present disclosure. For example, the POIs may include the positions of objects 16 detectable within the first and second fields of view 18, 24 by both the roadside camera 12 and the range sensor 14 and which have been identified as being OOIs within the ROIs, and/or having MOIs as well.

In several aspects, based on the ROI, MOI, OOI, and POI, the system 10 focuses on a specific segment of the roadway 28, specific objects 16 (e.g., cars only, etc.), and the objects 16 are localized in simple terms. For example, the simplified terms may be the left and right sides of a two-lane roadway 28. To further simplify, the system 10 executes control logic that identifies and matches left and right moving objects 16. The system 10 then filters complicated scenarios by specifying motion constraints. In some examples, the motion constraints may include, but are not limited to: straight-line motion only, motion in a specific direction only, discard data containing lane changes, or the like. However, other constraints may be used without departing from the scope or intent of the present disclosure. Furthermore, to avoid occlusion-related issues whereby an object 16 in the foreground obscures or partially obscures an object 16 behind it, the system 10 focuses only on objects 16 in "front" of, or within the ROI. That is, the system 10 focuses on objects 16 having no other objects 16 in front of themselves. In more complicated scenarios, such as roadways 28 having multiple lanes of traffic moving in more than two directions at a given intersection 32, advanced algorithms such as Bipartie graphs or Hungarian matching algorithms are leveraged to increase the accuracy and precision of object 16 matching in data from multiple sensor sources, including data from the roadside camera 12 and the range sensors 14.

Referring again more specifically to the first, second and third frames 100, 102, and 104, the first frame 100 is a depiction of a roadway 28 having multiple first objects 16' disposed thereon. Each of the first objects 16' is in motion in accordance with directional arrows 106. A second set of objects 16" are shown as well. The second set of objects 16" are behind the first objects 16, relative to the direction of motion 106 of the first objects 16'. It should be appreciated that there is nothing in front of the first objects 16' and that the first objects 16' are moving generally towards a roadside camera 12 and a range sensor 14.

The second frame 102 is a depiction of the first field of view 18 of the roadside camera 12 and contains road markings and the first objects 16' but in a skewed perspective that corresponds to the roadside camera 12 pose relative to the real-world and the world coordinate system 52. Likewise, the third frame 104 is a depiction of the second field of view 24 of the range sensor 14. In the example shown in the third frame 104, the range sensor 14 is a RADAR sensor and while the RADAR sensor has detected the same first objects 16', they are depicted as very small dots 108 that define the radar cross-sections of the first objects 16'. Accordingly, the data detected by each of the roadside camera 12 and the RADAR sensor (range sensor 14) are distinct from one another, but similarly localized.

It will be appreciated that object 16 classification in roadside camera 12 data versus radar cross section (RCS) data in RADAR sensor data can be leveraged to confirm object 16 matches. For example, the RCS of a truck is likely to be significantly larger than the RCS of a car. Likewise a car can be differentiated from a truck in roadside camera 12 data. Combined, the information from both the roadside camera 12 and range sensors 14, such as RADAR sensors increases accuracy and precision in not only localizing objects 16 within the first and second fields of view 18, 24, but also the motions of such objects 16 and confirming object 16 matches.

Figure 5:
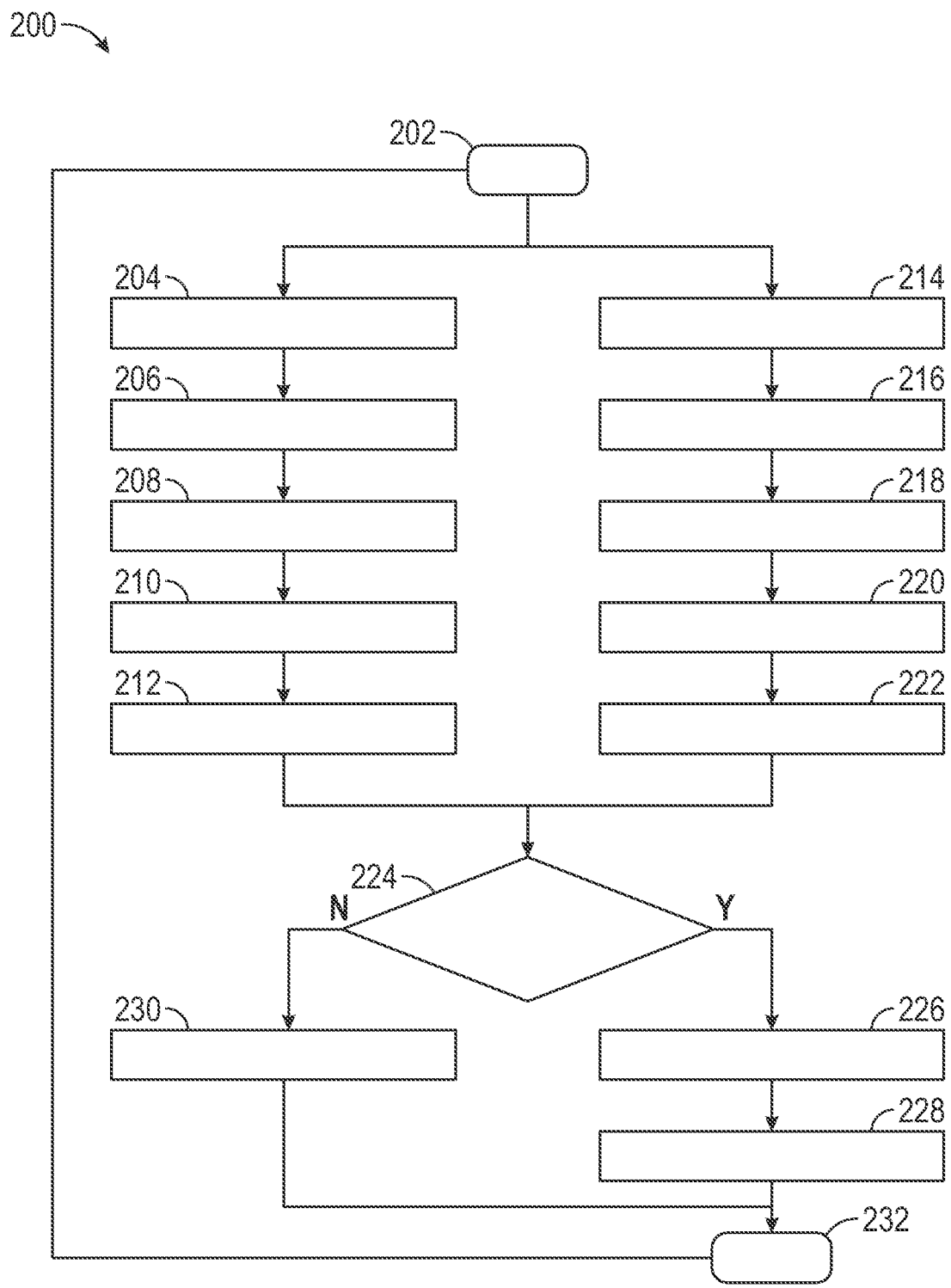
FIG. 5 is a flowchart of a method of calibrating roadside cameras using range sensors for ADAS applications according to an exemplary embodiment.

Turning now to FIG. 5 and with continuing reference to FIGS. 1-4, a flowchart depicting a method 200 of calibrating roadside cameras 12 with the system 10 of the present disclosure is shown. The method begins at block 202. At block 204, the system 10 executes control logic that causes the roadside camera 12 to obtain image and/or videographic data of the first field of view 18. At block 206, the system 10 executes control logic that applies a first ROI filter to the image and/or videographic data from the roadside camera 12. The first ROI filter constrains the image and/or videographic data from the roadside camera 12 to the predefined sub-region or ROI of the first field of view 18. The method 200 then proceeds to block 208.

At block 208, the system 10 executes control logic that applies a first MOI filter to the image and/or videographic data within the ROI of the first field of view 18. The first MOI filter further constrains the data contained within the image and/or videographic data by selecting only the motions of objects 16 that are highly predictable, and consistent. In some examples, the first MOI filter selects movement detected in a straight-line, or in a specific predefined direction, or the like. The method 200 then proceeds to block 210.

At block 210, the system 10 executes control logic that applies a first OOI filter to the image and/or videographic data within the ROI and corresponding to the MOI filtered-data. The first OOI filter further constrains the data within the image and/or videographic data by selecting only objects 16 within the ROI, which have MOI, and that are easily viewed by the roadside camera 12 without being obscured, obfuscated, or the like. That is, the OOIs are objects 16 that are not obscured or partially obscured by other objects 16, by infrastructure, by inclement weather conditions, or by other optical, electromagnetic, or audio impairments or conditions. The method 200 then proceeds to block 212.

At block 212, the system 10 executes control logic that applies a first POI filter or relative positioning filter to the image and/or videographic data from the roadside camera 12. The first POI filter further constrains the data within the image and/or videographic data by selecting only objects 16 within the ROI, which have MOI, and that have been identified as OOIs and further identifies the positions of objects 16 that are of particular interest to the roadside camera 12 calibration process. Such POIs may include locations within the ROI such as lane lines, the positions of roadway 28 signage, trees, traffic signals, telecommunications poles, fire hydrants, curbs, or other such objects 16 having well-defined positions, or the like. Such POIs offer well-defined and easily documented and reliable data for comparison between the roadside camera 12 data and the range sensor 14 data for calibration purposes.

At block 214, the system 10 executes control logic that causes the range sensor 14 to obtain range sensor data of the second field of view 24. At block 216, the system 10 executes control logic that applies a second ROI filter to the range sensor 14 data. The second ROI filter constrains the range sensor 14 data to a predefined sub-region or ROI of the second field of view 24. The method 200 then proceeds to block 218.

At block 218, the system 10 executes control logic that applies a second MOI filter to the range sensor 14 data within the ROI of the second field of view 24. The second MOI filter further constrains the data contained within the range sensor 14 data by selecting only the motions of objects 16 that are highly predictable, and consistent. In some examples, the second MOI filter selects movement detected in a straight-line, or in a specific predefined direction, or the like. The method 200 then proceeds to block 220.

At block 220, the system 10 executes control logic that applies a second OOI filter to the range sensor 14 data within the ROI and corresponding to the MOI filtered-data. The second OOI filter further constrains the data within the range sensor 14 data by selecting only objects 16 within the ROI, which have MOI, and that are easily viewed by the roadside camera 12 without being obscured, obfuscated, or the like. That is, the OOIs are objects 16 that are not obscured or partially obscured by other objects 16, by infrastructure, by inclement weather conditions, or by other optical, electro-magnetic, or audio impairments or conditions. The method 200 then proceeds to block 222.

At block 222, the system 10 executes control logic that applies a second POI filter or relative positioning filter to the range sensor 14 data. The second POI filter further constrains the data within the range sensor 14 data by selecting only objects 16 within the ROI, which have MOI, and that have been identified as OOIs and further identifies the positions of objects 16 that are of particular interest to the roadside camera 12 calibration process. Such POIs may include locations within the ROI such as lane lines, the positions of roadway 28 signage, trees, traffic signals, telecommunications poles, fire hydrants, curbs, or other such objects 16 having well-defined positions, or the like. Such POIs offer well-defined and easily documented and reliable data for comparison between the roadside camera 12 data and the range sensor 14 data for calibration purposes. It should be appreciated that while blocks 204-222 have been described sequentially herein, the first and second ROI filters may be executed in parallel, the first and second MOI filters may be executed in parallel, the first and second OOI filters may be executed in parallel, and the first and second POI filters may be executed in parallel without departing from the scope or intent of the present disclosure. Likewise, the first and second ROI, MOI, OOI, and POI filters may be executed in differing orders than those described herein, or may be executed entirely simultaneously and/or in parallel without departing from the scope or intent of the present disclosure.

At block 224 the system 10 executes matching control logic that determines whether objects 16 identified as having satisfied both the first ROI, MOI, OOI, and POI filters and the second ROI, MOI, OOI, and POI filters have been detected. Upon determining that objects 16 have been detected that satisfy both first and second ROI, MOI, OOI, and POI filters, the method 200 proceeds to block 226 where one or more objects 16 that have satisfied one or more of the first ROI, MOI, OOI, and POI filters, and which have also satisfied one or more of the second ROI, MOI, OOI, and POI filters are stored in the memory 36 for calibration of the roadside camera 12. In several aspects, in order to properly calibrate the roadside camera 12, the first and second ROI, MOI, OOI, and POI filters are satisfied by objects 16 detected at a plurality of different radial ranges or radial distances $r_d$ from each of the roadside camera 12 and the range sensor 14. The plurality of different radial ranges or radial distances $r_d$ from each of the roadside camera 12 and the range sensor 14 improve the quality and accuracy of the calibration by avoiding the potential for calibrating or, in essence, focusing the calibration at a first radial range or distance $r_d$, while ignoring other possible radial ranges or distances $r_d$ at which the calibration for the first radial range or distance $r_d$ is, in fact, incorrect. Accordingly, the accuracy of the system 10 is improved by including objects 16 which have satisfied the first and second ROI, MOI, OOI, and POI filters, and which are located at a variety of different radial ranges or distances $r_d$ from the roadside camera 12 and from the range sensor 14. In further examples, when the roadside camera 12 and range sensor 14 are not co-located, the physical size and shape of the objects 16 detected and satisfying the first and second ROI, MOI, OOI, and POI filters may cause uncertainty as to whether or not the objects 16 detected are, in fact, matching objects 16.

Accordingly, in order to ensure proper matching, at least a portion of the matching control logic includes a time-synchronization algorithm or process. The time-synchronization algorithm or process may be any of a variety of processes that accounts for the physical relative locations, image or data capture frequencies or periodicities of the roadside camera 12 and range sensor 14, and the like, as well as the directionality, accelerations and velocities of the objects 16 detected and satisfying the first and second ROI, MOI, OOI, and POI filters are, in fact, the same objects 16 detected in both the first and second ROI, MOI, OOI, and POI filters. In some examples, the time-synchronization algorithm may be executed within the controller 26, or within a separate and distinct time server, or within a distinct time-server application, subroutine, or control logic within the controller 26.

Once matching objects 16 have been determined, the method 200 proceeds to block 228 where the method 200 calibrates the roadside camera 12 by applying a correction factor to position information for each object 16 detected within the first field of view 18 and satisfying the first ROI, MOI, OOI, and POI filters. The correction factor may be a mathematical weight or other such multiplicative factor that accounts for the relative positions of the range sensor 14 and roadside camera 12 in relation to the matching objects 16.

Referring once more to block 224, when matching objects 16 are not found, the method 200 proceeds to block 230 where the objects 16 detected, but not otherwise satisfying the first and second ROI, MOI, and POI filters are discarded. From blocks 228 and 230, the method 200 proceeds to block 232, where the method 200 ends. From block 232, the method 200 proceeds back to block 202 where the method 200 runs again.

It should be appreciated that the method 200 may be executed or run automatically, recursively, continuously, periodically, or upon the occurrence of a particular condition, such as manual initialization by a human without departing from the scope or intent of the present disclosure. It should further be noted that while the method 200 may be run as described above, in many examples, the method 200 is only executed while the range sensor 14 is being used to calibrate the roadside camera 12. That is, in many instances, roadside cameras 12 need only to be calibrated occasionally, or upon the occurrence of certain conditions, such as when a newly-installed roadside camera 12 is being calibrated, or for roadside cameras 12 whose physical, geometrical position has changed due to weather (high wind speed, snow, hail, or the like); vehicle 19 collisions with infrastructure-mounted roadside cameras 12, construction, roadway 28 modifications, or the like.

Further, while in the foregoing, the calibration process has been described as being used to calibrate the roadside camera 12, it should be appreciated that substantially the same or similar systems 10 and methods 200 as those described herein may be used to calibrate range sensors 14, range sensors 14 and cameras 12, or the like, without departing from the scope or intent of the present disclosure.

A system 10 and method 200 of the present disclosure for calibrating roadside cameras 12 calibrating roadside cameras 12 with range sensors 14, or vice versa, offers several advantages. These include, improved efficiency over manual calibration processes, decreased complexity, and reduction in time and effort needed to perform roadside camera 12 and/or range sensor 14 calibration for use in camera-based advanced driver assistance systems (ADAS) applications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for range sensor-based calibration of roadside cameras comprising:
    one or more roadside cameras, the roadside cameras fixedly mounted to infrastructure and having a first field of view of at least a portion of a roadway;
    one or more range sensors, the range sensors fixedly mounted to infrastructure and having a second field of view of at least a portion of a roadway, wherein the first and second fields of view at least partially overlap;
    one or more controllers, each of the one or more controllers having a processor, a memory, and one or more input/output (I/O) ports, the I/O ports in communication with the one or more range sensors and the one or more roadside cameras; the memory storing programmatic control logic; the processor executing the programmatic control logic; the programmatic control logic including:
    a first control logic for causing each of the one or more roadside cameras to capture image data, and for causing each of the range sensors to capture range sensor data;
    a second control logic that filters the image data to focus on a first region of interest (ROI), and that filters the range sensor data to focus on a second ROI;
    a third control logic that filters the image data to focus on a first movement of interest (MOI), and that filters the range sensor data to focus on a second MOI;
    a fourth control logic that filters the image data to focus on a first object of interest (OOI), and that filters the range sensor data to focus on a second OOI;
    a fifth control logic that filters the image data to focus on a first position of interest (POI), and that filters the range sensor data to focus on a second POI;
    a sixth control logic that selectively determines that objects detected by the roadside camera and by the range sensor satisfy both the first and second ROI, MOI, OOI, and POI filters and defines the objects as matching objects;
    a seventh control logic that saves the matching objects in the memory for calibration; and
    an eighth control logic that calibrates the roadside camera by applying a correction factor based on the matching objects, so that the roadside camera accurately and precisely reports locations and movements of the matching objects for use in ADAS applications.

2. The system of claim 1, wherein the second control logic further comprises:
    control logic that constrains the image data from the roadside camera to a sub-region or ROI within the first field of view in which the image data captured by the roadside camera is reliably accurate and precise;
    control logic that constrains the range sensor data from the range sensor to a sub-region or ROI within the second field of view in which the range sensor data captured by the range sensor is reliably accurate and precise; and
    wherein the ROIs within the first and second fields of view are substantially identical.

3. The system of claim 1, wherein the third control logic further comprises:
    control logic that constrains the image data to focus on the first MOI, wherein the first MOI includes predictable and consistent motions of objects along the roadway; and
    control logic that constrains the range sensor data to focus on the second MOI, wherein the second MOI includes predictable and consistent motions of objects along the roadway.

4. The system of claim 3, wherein the predictable and consistent motions of objects along the roadway further comprise:
    motions in a predefined set of directions, linear or straight-line motions, and motions at predefined accelerations and velocities.

5. The system of claim 1, wherein the fourth control logic further comprises:
    control logic that constrains the image data to define first OOIs by selecting objects that satisfy the first ROI filter, the first MOI filter, and that are directly and unobstructedly viewable by the roadside camera; and
    control logic that constrains the range sensor data to define second OOIs by selecting objects that satisfy the second ROI filter, the second MOI filter, and that are directly and unobstructedly viewable by the range sensor.

6. The system of claim 5, wherein the fifth control logic further comprises:
    control logic that constrains the image data by selecting only first OOIs that are locations within the first ROI having predefined fixed or mobile positions;
    control logic that constrains the range sensor data by selecting only second OOIs that are at locations within the second ROI having predefined fixed or mobile positions; and
    wherein the predefined fixed or mobile positions comprise: locations of lane lines, positions of roadway signage, trees, traffic signals, telecommunications poles, fire hydrants, and/or curbs, and positions of movable or moving OOIs.

7. The system of claim 1, wherein the sixth control logic further comprises:
    control logic that defines the objects as matching objects by comparing objects that satisfy both the first and second ROI, MOI, OOI, and POI filters and verifying one or more of the objects that satisfy both the first and second ROI, MOI, OOI, and POI filters is an identical object detected by both the roadside camera and the range sensor.

8. The system of claim 7, wherein the eighth control logic further comprises:

control logic that applies the correction factor to image data captured by the roadside camera, wherein the correction factor is based on known physical and geometrical locations of the roadside camera relative to known physical and geometrical locations of the range sensor, and takes a point location in a real-world coordinate system and translates the point to a camera coordinate system according to a calibration matrix $K[I_3|0_3]$ is a calibration matrix based on a world-homography matrix "H":

1.

$$H = KR[I_3 | -\tilde{C}]$$

where R is a rotation and C takes from the world coordinate system to the center of projection of the camera coordinate system;

2.

$$\begin{bmatrix} u' \\ v' \\ w' \end{bmatrix} = \begin{bmatrix} \alpha_x & s & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix}$$

with $\alpha_x = fk_x$ and $\alpha_y = -fk_y$; and $x_{pix} = u'/w'$ and $y_{pix} = v'/w'$ so that:

3.

$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 | 0_3]$$

where $\alpha_x$ and $\alpha_y$ are focal lengths in pixels and $x_0$ and $y_0$ are the coordinates of a center of the image in pixels, "s" is a skew parameter that accounts for roadside camera perspective angle and position, and $K[I_3|0_3]$ is a calibration matrix.

9. The system of claim 8, wherein the calibration matrix $K[I_3|0_3]$ is further adjusted based on the known relative positions of the roadside camera and the range sensor, and based on a radial range or distance $r_d$ between the roadside camera the object in the world coordinate system such that and a height $h_1$ of the roadside camera above ground at which the roadside camera is fixedly mounted, such that: $r = \sqrt{r_d^2 - h_1^2}$.

10. A method for range sensor-based calibration of roadside cameras comprising:

capturing image data with one or more roadside cameras, the roadside cameras fixedly mounted to infrastructure and having a first field of view of at least a portion of a roadway;

capturing range sensor data with one or more range sensors, the range sensors fixedly mounted to infrastructure and having a second field of view of at least a portion of a roadway, wherein the first and second fields of view at least partially overlap;

executing programmatic control logic stored within a memory of one or more controllers in communication with the one or more roadside cameras and the one or more range sensors, each of the one or more controllers having a processor, the memory, and one or more input/output (I/O) ports, the I/O ports in communication with the one or more range sensors and the one or more roadside cameras; the processor executing the programmatic control logic; the programmatic control logic including:

filtering the image data to focus on a first region of interest (ROI), and filtering the range sensor data to focus on a second ROI;

filtering the image data to focus on a first movement of interest (MOI), and filtering the range sensor data to focus on a second MOI;

filtering the image data to focus on a first object of interest (OOI), and filtering the range sensor data to focus on a second OOI;

filtering the image data to focus on a first position of interest (POI), and filtering the range sensor data to focus on a second POI;

selectively determining that objects detected by the roadside camera and by the range sensor satisfy both the first and second ROI, MOI, OOI, and POI filters and defining the objects as matching objects;

saving the matching objects in the memory for calibration; and calibrating the roadside camera by applying a correction factor based on the matching objects, so that the roadside camera accurately and precisely reports locations and movements of the matching objects for use in ADAS applications.

11. The method of claim 10, further comprising:

constraining the image data from the roadside camera to a sub-region or ROI within the first field of view in which the image data captured by the roadside camera is reliably accurate and precise;

constraining the range sensor data from the range sensor to a sub-region or ROI within the second field of view in which the range sensor data captured by the range sensor is reliably accurate and precise; and wherein the ROIs within the first and second fields of view are substantially identical.

12. The method of claim 10, further comprising:

constraining the image data to focus on the first MOI, wherein the first MOI includes predictable and consistent motions of objects along the roadway; and constraining the range sensor data to focus on the second MOI, wherein the second MOI includes predictable and consistent motions of objects along the roadway.

13. The method of claim 12, wherein constraining the image and sensor data further comprises:

selecting predictable and consistent motions of objects along the roadway including motions in a predefined set of directions, linear or straight-line motions, and motions at predefined accelerations and velocities.

14. The method of claim 10, further comprising:

constraining the image data to define first OOIs by selecting objects that satisfy the first ROI filter, the first MOI filter, and that are directly and unobstructedly viewable by the roadside camera; and constraining the range sensor data to define second OOIs by selecting objects that satisfy the second ROI filter, the second MOI filter, and that are directly and unobstructedly viewable by the range sensor.

15. The method of claim 14, further comprising constraining the image data by selecting only first OOIs that are locations within the first ROI having predefined fixed or mobile positions;

constraining the range sensor data by selecting only second OOIs that are at locations within the second ROI having predefined fixed or mobile positions; and wherein the predefined fixed or mobile positions comprise: locations of lane lines, positions of roadway signage, trees, traffic signals, telecommunications poles, fire hydrants, and/or curbs, and positions of movable or moving OOIs.

16. The method of claim 10, further comprising:

defining the objects as matching objects by comparing objects that satisfy both the first and second ROI, MOI, OOI, and POI filters and verifying one or more of the objects that satisfy both the first and second ROI, MOI, OOI, and POI filters is an identical object detected by both the roadside camera and the range sensor.

17. The method of claim 16, further comprising:

applying the correction factor to image data captured by the roadside camera, wherein the correction factor is based on known physical and geometrical locations of the roadside camera relative to known physical and geometrical locations of the range sensor, and takes a point location in a real-world coordinate system and translates the point to a camera coordinate system according to a calibration matrix K[I$_3$|0$_3$] is a calibration matrix based on a world-homography matrix "H":

1.

$$H = KR[I_3 | -\tilde{C}]$$

where R is a rotation and C takes from the world coordinate system to the center of projection of the camera coordinate system;

2.

$$\begin{bmatrix} u' \\ v' \\ w' \end{bmatrix} = \begin{bmatrix} \alpha_x & s & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix}$$

with $\alpha_x = fk_x$ and $\alpha_y = -fk_y$; and $x_{pix} = u'/w'$ and $y_{pix} = v'/w'$ so that:

3.

$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 | 0_3]$$

where $\alpha_x$ and $\alpha_y$ are focal lengths in pixels and $x_0$ and $y_0$ are the coordinates of a center of the image in pixels, "s" is a skew parameter that accounts for roadside camera perspective angle and position, and K[I$_3$|0$_3$] is a calibration matrix.

18. The method of claim 17, further comprising:

adjusting the calibration matrix K[I$_3$|0$_3$] based on known relative positions of the roadside camera and the range sensor, and based on a radial range or distance $r_d$ between the roadside camera the object in the world coordinate system such that and a height $h_1$ of the roadside camera above ground at which the roadside camera is fixedly mounted, such that: $r = \sqrt{r_d^2 - h_1^2}$.

19. A method for range sensor-based calibration of roadside cameras comprising:

capturing image data with one or more roadside cameras, the roadside cameras fixedly mounted to infrastructure and having a first field of view of at least a portion of a roadway;

capturing range sensor data with one or more range sensors, the range sensors fixedly mounted to infrastructure and having a second field of view of at least a portion of a roadway, wherein the first and second fields of view at least partially overlap;

executing programmatic control logic stored within a memory of one or more controllers in communication with the one or more roadside cameras and the one or more range sensors, each of the one or more controllers having a processor, the memory, and one or more input/output (I/O) ports, the I/O ports in communication with the one or more range sensors and the one or more roadside cameras; the processor executing the programmatic control logic; the programmatic control logic including:

constraining the image data from the roadside camera to a sub-region or region of interest (ROI) within the first field of view in which the image data captured by the roadside camera is reliably accurate and precise;

constraining the range sensor data from the range sensor to a sub-region or ROI within the second field of view in which the range sensor data captured by the range sensor is reliably accurate and precise, wherein the ROIs within the first and second fields of view are substantially identical;

constraining the image data to focus on a first movement of interest (MOI), wherein the first MOI includes predictable and consistent motions of objects along the roadway;

constraining the range sensor data to focus on a second MOI, wherein the second MOI includes predictable and consistent motions of objects along the roadway including motions in a predefined set of directions, linear or straight-line motions, and motions at predefined accelerations and velocities;

constraining the image data to define first objects of interest (OOIs) by selecting objects that satisfy a first ROI filter, a first MOI filter, and that are directly and unobstructedly viewable by the roadside camera;

constraining, by a first OOI filter, the image data by selecting only first OOIs that are locations within the first ROI having predefined fixed or mobile positions;

constraining, by a second OOI filter, the range sensor data by selecting only second OOIs that are at locations within the second ROI having predefined fixed or mobile positions and that are directly and unobstructedly viewable by the range sensor;

wherein the predefined fixed or mobile positions comprise: locations of lane lines, positions of roadway signage, trees, traffic signals, telecommunications poles, fire hydrants, and/or curbs, and positions of movable or moving OOIs;

filtering, by a first position of interest (POI) filter, the image data to focus on a first POI, and filtering, by a second POI filter, the range sensor data to focus on a second POI;

selectively determining that objects detected by the roadside camera and by the range sensor satisfy both the first and second ROI, MOI, OOI, and POI filters and defining the objects as matching objects by comparing objects that satisfy both the first and second ROI, MOI, OOI, and POI filters and verifying one or more of the objects that satisfy both the first and second ROI, MOI, OOI, and POI filters is an identical object detected by both the roadside camera and the range sensor;

saving the matching objects in the memory for calibration; and calibrating the roadside camera by applying a correction factor based on the matching objects, so that the roadside camera accurately and precisely reports locations and movements of the matching objects for use in ADAS applications, wherein the correction factor is based on known physical and geometrical locations of the roadside camera relative to known physical and geometrical locations of the range sensor, and takes a point location in a real-world coordinate system and translates the point to a camera coordinate system according to a calibration matrix $K[I_3|0_3]$ based on a world-homography matrix "H":

$$H = KR[I_3 \mid -\tilde{C}]$$

where R is a rotation and C takes from the world coordinate system to the center of projection of the camera coordinate system;

2.

$$\begin{bmatrix} u' \\ v' \\ w' \end{bmatrix} = \begin{bmatrix} \alpha_x & s & x_0 & 0 \\ 0 & \alpha_y & y_0 & 0 \\ 0 & 0 & 1 & 0 \end{bmatrix} \begin{bmatrix} x_s \\ y_s \\ z_s \\ 1 \end{bmatrix}$$

with $\alpha_x = fk_x$ and $\alpha_y = -fk_y$; and $x_{pix} = u'/w'$ and $y_{pix} = v'/w'$ so that:

3.

$$\begin{bmatrix} \alpha_x & s & x_0 & 0 \\ 0 & \alpha_y & y_0 & 0 \\ 0 & 0 & 1 & 0 \end{bmatrix} = \begin{bmatrix} \alpha_x & s & x_0 \\ 0 & \alpha_y & y_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} = K[I_3 \mid 0_3]$$

where $\alpha_x$ and $\alpha_y$ are focal lengths in pixels and $x_0$ and $y_0$ are the coordinates of a center of the image in pixels, "s" is a skew parameter that accounts for roadside camera perspective angle and position, and $K[I_3|0_3]$ is the calibration matrix.

20. The method of claim 19, further comprising:

adjusting the calibration matrix $K[I_3|0_3]$ based on known relative positions of the roadside camera and the range sensor, and based on a radial range or distance $r_d$ between the roadside camera the object in the world coordinate system such that and a height $h_1$ of the roadside camera above ground at which the roadside camera is fixedly mounted, such that: $r=\sqrt{r_d^2-h_1^2}$.

* * * * *